United States Patent
Palma et al.

(12) 
(10) Patent No.: US 8,824,761 B2
(45) Date of Patent: Sep. 2, 2014

(54) IMAGE PROCESSING METHOD TO DETERMINE SUSPECT REGIONS IN A TISSUE MATRIX, AND USE THEREOF FOR 3D NAVIGATION THROUGH THE TISSUE MATRIX

(75) Inventors: Giovanni Palma, Issy les Moulineaux (FR); Razvan Iordache, Paris (FR); Sylvain Bernard, Montigny le Bretonneux (FR)

(73) Assignee: General Electric Company, Schenectady, NY (US)

( * ) Notice: Subject to any disclaimer, the term of this patent is extended or adjusted under 35 U.S.C. 154(b) by 166 days.

(21) Appl. No.: 13/214,032

(22) Filed: Aug. 19, 2011

(65) Prior Publication Data

US 2012/0045111 A1 Feb. 23, 2012

(30) Foreign Application Priority Data

Aug. 23, 2010 (FR) ...................................... 10 56712

(51) Int. Cl.
| | |
|---|---|
| *G06K 9/00* | (2006.01) |
| *G06T 15/00* | (2011.01) |
| *G06T 17/00* | (2006.01) |
| *G06T 15/50* | (2011.01) |

(52) U.S. Cl.
USPC ........... 382/131; 382/128; 345/419; 345/420; 345/426

(58) Field of Classification Search
USPC ....................................................... 382/285
See application file for complete search history.

(56) References Cited

U.S. PATENT DOCUMENTS

| | | | | |
|---|---|---|---|---|
| 4,860,213 A | * | 8/1989 | Bonissone | 706/52 |
| 5,369,734 A | * | 11/1994 | Suzuki et al. | 345/421 |
| 5,647,018 A | * | 7/1997 | Benjamin | 382/128 |
| 6,389,104 B1 | * | 5/2002 | Bani-Hashemi et al. | 378/98.12 |

(Continued)

FOREIGN PATENT DOCUMENTS

| | | |
|---|---|---|
| FR | 2872659 A1 | 1/2006 |
| FR | 2902218 A1 | 6/2006 |
| FR | 2954556 A1 | 6/2011 |

OTHER PUBLICATIONS

Palma, Giovanni, Bloch, Isabelle, and Muller, Serge, "Spiculated Lesions and Architectural Distortions Detection in Digital Breast Tomosynthesis Datasets", Telcom ParisTech (ENST) CNRS LTCI, 46 rue Barrault, 75013 Paris, France, 10th International Workshop, IWDM 2010, Girona, Catalonia, Spain, Jun. 16-18, 2010. Proceedings.

(Continued)

*Primary Examiner* — Michelle Entezari
(74) *Attorney, Agent, or Firm* — Global Patent Operation; Marc A. Vivenzio (57) ABSTRACT

A method to generate a final image with a medical imaging system, wherein the final image highlights suspect regions in a tissue matrix and wherein the final image is generated from a first image and from previously acquired images of the tissue matrix is provided. The method comprises: creating a 3D map of suspicion from the previously acquired medical images; generating a 2D map of suspicion by projecting all or part of the 3D map of suspicion onto a plane from a point reproducing the conditions of acquisition of the first image; and generating a final 2D image of the tissue matrix from the first image and/or from the 2D map of suspicion, wherein the final 2D image highlights suspect regions in the tissue matrix.

9 Claims, 4 Drawing Sheets

(56) References Cited

U.S. PATENT DOCUMENTS

| | | | |
|---|---|---|---|
| 7,693,254 B2* | 4/2010 | Muller et al. | 378/37 |
| 7,853,064 B2 | 12/2010 | Bernard et al. | |
| 8,351,574 B2* | 1/2013 | Takemoto et al. | 378/98 |
| 2005/0047637 A1* | 3/2005 | Greenbaum et al. | 382/132 |
| 2005/0099416 A1* | 5/2005 | Moreau-Gobard et al. | 345/419 |
| 2006/0002509 A1 | 1/2006 | Claus et al. | |
| 2006/0280348 A1* | 12/2006 | Smith et al. | 382/128 |
| 2007/0159480 A1* | 7/2007 | Delarue et al. | 345/427 |
| 2008/0019581 A1 | 1/2008 | Gkanatsios et al. | |
| 2008/0118182 A1* | 5/2008 | Koole | 382/284 |
| 2008/0139938 A1* | 6/2008 | Yang et al. | 600/445 |
| 2008/0146932 A1* | 6/2008 | Chalana et al. | 600/447 |
| 2008/0170665 A1* | 7/2008 | Marar et al. | 378/91 |
| 2009/0052763 A1* | 2/2009 | Acharyya et al. | 382/132 |
| 2010/0080429 A1* | 4/2010 | Li | 382/131 |
| 2011/0150178 A1 | 6/2011 | Bernard et al. | |

OTHER PUBLICATIONS

Bernard, S. et al., "Computer-Aided Microcalcification Detection on Digital Breast Tomosynthesis Data: a Preliminary Evaluation" In International Workshop on Digital Mammography (IWDM) 2008.

Search Report from French Application No. 0156712 dated Mar. 2, 2011.

Unofficial translation of Written Opinion from French Application No. 0156712 dated Mar. 2, 2011.

* cited by examiner

IMAGE PROCESSING METHOD TO DETERMINE SUSPECT REGIONS IN A TISSUE MATRIX, AND USE THEREOF FOR 3D NAVIGATION THROUGH THE TISSUE MATRIX

BACKGROUND OF THE INVENTION

1. Field of the Invention

Generally, the field of invention concerns medical imaging and more precisely, a method for generating medical images to highlight suspect regions in a tissue matrix. These images are generated from two-dimensional or three-dimensional medical images of the same object and are combined with the results from a system to detect radiologically suspect regions in said object. The method to generate medical images is used to detect lesions of cancerous type, notably breast lesions.

2. Description of Related Art

For the diagnosis of breast cancer, radiology is generally used to obtain an image of the inside of the breast. A two-dimensional (2D) radiological image shows a projection of a tissue matrix, e.g. a breast for breast cancer diagnosis, onto a plane formed by a detector, from a radiation source. The radiological image is generally obtained by placing the object of interest between the X-ray emitting source and the X-ray detector, so that the rays reach the detector after passing through the object. The radiological image is then created from data provided by the detector, and represents the tissue matrix projected onto the detector in the direction of the X-rays.

In such a radiological image, an experienced practitioner can distinguish radiological signs indicating a potential problem, e.g. micro-calcifications or opacities in the case of mammography. However, a radiological image is derived from a two-dimensional projection of a three-dimensional tissue matrix. Tissue superimposition may mask radiological signs such as lesions, and under no circumstance is the true position of the radiological signs inside the object of interest known; the practitioner having no information on the position of the radiological signs in the direction of projection.

Tomosynthesis has recently been developed to address these issues; it allows a three-dimensional (3D) representation of an object of interest to be obtained in the form of a series of successive slices. These slices are reconstructed from projections of the object of interest at different angles. For this purpose, the object of interest is generally placed between an X-ray emitting source and an X-ray detector. The source and/or the detector are movable, which means that the projection direction of the object of interest onto the detector can be varied (typically over an angle range of 30°). In this manner, several projections of the object of interest are obtained at different angles, from which a 3D representation of the object of interest can be reconstructed, generally using a reconstruction method well known to the person skilled in the art, see for example document FR 2 872 659.

Therefore, when examining the tomosynthesis slices of an object of interest, a practitioner is able to detect radiological signs in the object of interest and to assess their position in three dimensions. However, practitioners have years of experience in the analysis of 2D radiological images (standard mammography), whereas the analysis of tomosynthesis slices has only just begun.

Therefore, a transition period is preferable. During this transition period, practitioners will have to analyze tomosynthesis slices of an object of interest accompanied by standard mammography images of one same object of interest, in order to gain experience and comfort in analysing 3D slices and comparing these with conventional 2D radiology images as part of a study on changes in radiological signs over time. From this perspective, research has been conducted to produce radiographic image acquisition systems to obtain radiological images and tomosynthesis slices of the same object of interest.

However, the practitioner will first look for a suspect region in the 2D radiological image before viewing the slices obtained by tomosynthesis. Thus, the problem relating to the superimposition of tissues in radiological images therefore remains.

BRIEF SUMMARY OF THE INVENTION

One of the objectives of the embodiments of the invention is therefore to overcome at least one of the shortcomings of the prior art.

For this, A method to generate a final image with a medical imaging system, wherein the final image highlights suspect regions in a tissue matrix and wherein the final image is generated from a first image and from previously acquired images of the tissue matrix, the method comprising: creating a 3D map of suspicion with a detection computer from the previously acquired medical images, wherein the 3D map of suspicion comprises a 3D matrix of voxels whose values indicate a degree of suspicion that shows whether the corresponding regions of the tissue matrix are suspect; generating a 2D map of suspicion with an implementing computer by projecting all or part of the 3D map of suspicion onto a plane from a point reproducing the conditions of acquisition of the first image, wherein the 2D map of suspicion comprises a 2D matrix of pixels whose values indicate a degree of suspicion that is determined from the corresponding degree of suspicion from the 3D map of suspicion; and generating a final 2D image of the tissue matrix with the implementing computer from the first image and/or from the 2D map of suspicion, wherein the final 2D image highlights suspect regions in the tissue matrix.

One advantage of this method is that a final 2D image is obtained which carries additional information compared with standard 2D medical images. Therefore, practitioners are provided with a diagnosis tool with which they are familiar. In addition, the indications allow a distinction to be made between pathological radiological signs and signs resulting from the superimposition of healthy tissues.

In another aspect, a computing system to generate a final image which highlights suspect regions in a tissue matrix is provided. The computing system comprising: a module configured to generate a 2D map of suspicion from a previously generated 3D map of suspicion obtained from medical images of the tissue matrix; a module configured to generate a volume from a 3D image of a tissue matrix and from the 3D map of suspicion; a module configured to generate an image of suspect radiological signs from a simulated projection of the volume onto a plane starting from a point; a module configured to generate a final 2D image from a first image, a previously acquired image, the 2D map of suspicion, and the image of suspect radiological signs by weighted addition thereof; a memory unit configured to store the 2D map of suspicion, the volume, the image of suspect radiological signs and the final 2D image; and a display unit configured to display at least one image.

BRIEF DESCRIPTION OF THE SEVERAL VIEWS OF THE DRAWINGS

Other objectives, characteristics and advantages will become apparent from the following detailed description, with reference to the drawings given for illustration purposes and non-limiting, among which.

For simplification and for reasons of legibility, in FIGS. 3, 4, 6, 8 only the different acquired or generated images are shown and not the detector or the plane on which they are obtained.

DETAILED DESCRIPTION OF THE INVENTION

Figure 1:
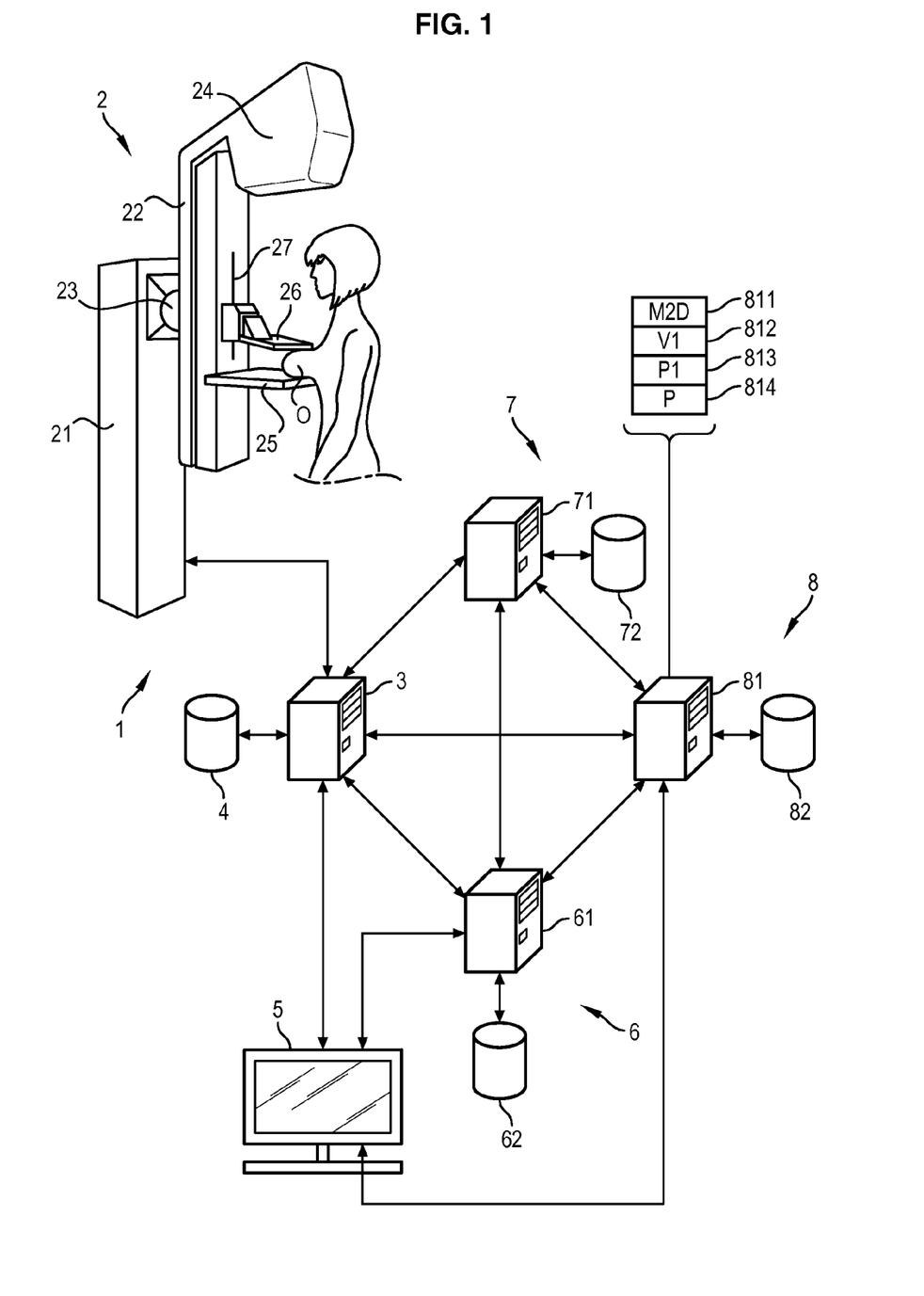
FIG. 1 schematically illustrates a medical imaging system used to acquire medical images, coupled with a computing system implementing the method.

A medical imaging system and an implementing system to generate a final 2D image highlighting suspect regions of a tissue matrix is provided. FIG. 1 schematically illustrates a medical imaging system 1 for the acquisition of images allowing the three-dimensional (3D) reconstruction of a tissue matrix O from two-dimensional (2D) images of the tissue matrix O. The medical imaging system 1 may be a mammography apparatus for the detection and characterization of radiological signs for the screening, diagnosis and treatment of breast cancer (tissue matrix).

The imaging system 1 comprises an acquisition unit 2 of 2D images. The acquisition unit 2 comprises a vertical stand 21 and a positioning arm 22 connected to a radiation source 21 e.g. X-ray source. The positioning arm 22 is rotationally joined to the vertical stand 21 about a rotation shaft 23. The vertical stand 21 is fixed. Therefore, by rotating the positioning arm 22, the source 24 can be positioned at various orientations.

The acquisition unit 2 also comprises a supporting arm provided with a platform comprising a detection support 25 and a compression support 26 parallel to the detection support 25 to compress the breast O placed between the two supports as illustrated in FIG. 1. The compression support 26 is positioned above the lower support 25 and can be moved in translation relative to the latter along a translation rail 27. The detection support 25 comprises a radiation detector to detect radiation corresponding to the radiation used by the source 21. The detection support 25 and compression support 26 keep the breast O immobile during the acquisition of medical images.

The positioning arm 22 and the supporting arms may be joined to one another or they may be separate allowing their rotation relative to each other about the rotation shaft 23. They are positioned relative to each other so that a large part of the radiation emitted by the source 24 is received by the detector.

The detector may be a semiconductor image sensor containing caesium iodide phosphor for example (scintillator) on a transistor/photodiode array in amorphous silicon. Other suitable detectors are: CCD sensor, direct digital detector which directly converts X-rays into digital signals. The detector illustrated in FIG. 1 is planar and defines a planar image surface, other geometries being suitable such as digital X-ray detectors of curved shape forming a curved image surface.

The imaging system 1 further comprises a control unit 3 connected to the acquisition unit 2 either by wire connection or via a network. The control unit 3 sends electric control signals to the acquisition unit 2 to set several parameters such as the radiation dose to be emitted, the angle position of the positioning arm 22, the angle positioning of the supporting arm, the compression force that the compression support 26 must apply to the breast O. The control unit 3 may comprise a reader device (not illustrated) e.g. a floppy disk reader, CD-ROM or DVD-ROM reader, or connection ports to read the instructions of the processing method from an instruction medium (not shown) such as a floppy disk, CD-ROM, DVD-ROM, or USB flash drive or more generally any removable memory medium or via a network connection. As a variant, the control unit 3 may comprise a wire or wireless network connection device (not shown). As a variant, the control unit 3 carries out the instructions of the processing method stored in firmware.

The imaging system 1 further comprises a memory unit 4 connected to the control unit 3 to record parameters and acquired images. It is also possible to make provision for a memory unit 4 to be located inside or outside the control unit 3. The memory unit 4 may be formed of a hard disk or SSD, or any other re-write, removable storage medium (USB flash drives, memory cards etc.). The memory unit 4 may be a ROM/RAM memory of the control unit 3, a USB flash drive, memory card, memory of a central server.

The imaging system 1 further comprises a display unit 5 connected to the control unit 3 to display acquired images and/or data on parameters which the control unit 3 must transmit to the acquisition unit 2. The display unit 5 may be integrated in the acquisition unit 2 or the control unit 3 or even in a 3D computer 61 described below, or it may be separate e.g. at a viewing station used by the radiologist to establish a diagnosis from digital medical images. The display unit 5 is for example a computer screen, or monitor, flat screen, plasma screen or any type of commercially known display device. The display unit 5 allows a practitioner to control the reconstruction and/or display of acquired 2D images.

The imaging system 1 is coupled with a computing system 6 comprising a 3D computer 61 which receives the acquired images stored in the memory unit 4 of the imaging system 1, from which it creates a 3D image of the breast using digital tomosynthesis. An example of a method for digital tomosynthesis of the breast is described in more detail in document FR 2 872 659. The computer 61 is one or more computers for example, one or more processors, one or more microcontrollers, one or more microcomputers, one or more programmable logic controllers, one of more application-specific integrated circuits, other programmable circuits, or other devices which include a computer such as a work station. The computing system 6 also comprises a memory unit 62 for the storage of data generated by the 3D computer 61.

The imaging and computing systems, respectively 1 and 6, are coupled with an automatic detection system 7 detecting suspect regions in the 3D image produced by the computing system 6. This detection system 7 comprises a detection computer 71 allowing a 3D map of suspicion to be produced giving information on suspect regions from the 3D image obtained from the computing system 6 and/or from data derived from the imaging system 1 and acquired during the same examination session associated with the 3D image. The detection computer 71 may be similar to the 3D computer 61.

The detection system 7 further comprises a memory unit 72 for the storage of data generated by the detection computer 71. The detection system 7, in some cases, may be the same as the computing system 6.

The imaging, computing and detection systems, respectively 1, 6 and 7, may also be connected to a system 8 dedicated to the implementation of the method described below. This implementing system 8 uses all or part of the data derived from the imaging 1, computing 6 and detection 7 systems, namely the acquisition data derived from the imaging system 1 and/or the 3D image created by the 3D computing system 6 and/or the 3D map of suspicion produced by the detection system 7. This implementing system 8, in some cases, may be the same as either the computing 6 or detection systems 7.

The transmission of data between the memory unit 4 of the imaging system 1 and the computing 6, detecting 7 or implementing 8 systems may take place via an internal or external computer network or via any suitable, physical memory medium such as floppy disks, CD-ROM, DVD-ROM, external hard disk, USB flash drive, or SD card.

To enable the implementation of the method described below, the implementing system 8 comprises a computer 81 equipped with a module 811 to generate a 2D map of suspicion M2D, a module 812 to generate a volume V1, a module 813 to generate an image P1 of suspect radiological signs and a module 814 to generate a final 2D image P. The computer 81 may comprise a reader device (not shown) e.g. a floppy disk reader, CD-ROM or DVD-ROM reader, or connection ports to read the instructions of the processing method from an instruction medium (not shown) such as a floppy disk, CD-ROM, DVD-ROM or USB key or more generally any removable memory medium or via a network connection. As a variant, the computer 81 may comprise a wire or wireless network connection device (not shown). As a variant, the computer 81 executes the instructions of the processing method stored in firmware.

The implementing computing system 8 may also comprise a display unit to display images generated by the computer 81. This display unit may be the same as the display unit 5 of the imaging system 1 (as illustrated in FIG. 1), or a separate display unit.

By coupling, it is meant that an imaging system 1 and the computing 6, detecting 7 and implementing 8 systems are used ultimately to obtain an image revealing suspect regions of a breast O. However, the imaging 1, computing 6, detecting 7 and implementing 8 systems are not systematically used at the same time and arranged in one same room. Nor are the imaging 1, computing 6, detecting 7 and implementing 8 systems necessarily physically connected. In this case, coupling takes place via data transfer from one system to another as described above.

In the remainder hereof, the description is made with reference to X-ray mammography. The tissue matrix in this case is the breast. This choice in no way reflects any limitation of the invention to the sole application to mammography. A person skilled in the art will be able to adapt the teaching described below to any type of image acquisition technique allowing the same.

With reference to FIGS. 1 to 4, four steps are described prior to the method for generating medical images subject of the embodiments of the invention. These steps are given by way of illustration, and the acquisition of similar data using other methods does not place in question the core of the embodiments of the invention described below.

Figure 3:
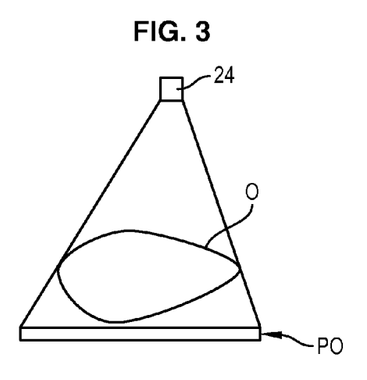
FIG. 3 illustrates the acquisition step of the method in FIG. 2 to acquire a first medical image of a tissue matrix.
Figure 4:
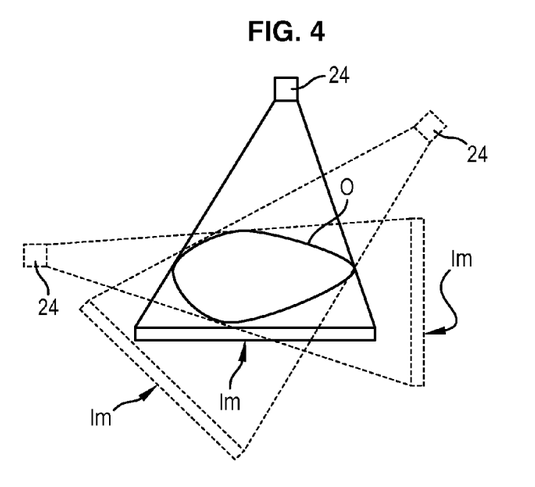
FIG. 4 illustrates an acquisition step of the method in FIG. 2 to acquire additional medical images.

One first prior step is the acquisition E1 of medical images Im which are to be used hereafter. These medical images Im are acquired using the imaging system 1. For this purpose, the breast O is positioned between the detection support 25 and the compression support 26 of the acquisition unit 2 belonging to the above-described imaging system 1. The compression support 26 is then brought towards the detection support 25 along the rail 27 to compress the breast O. This operation can be performed manually or under the control of the control unit 3. The control unit 3 then sends a positioning signal to the positioning arm 22 so that it rotates about the shaft 23 as far as the desired angle position. Optionally, the control unit 3 also sends a positioning signal to the supporting arm for angle positioning of the detector. The control unit 3 sends a signal to the source 24 so that it emits the determined radiation dose. The detector contained in the detection support 25 detects the radiation passing through the breast O, and the control unit 3 stores the image read on the detector in the memory unit 4. The control unit 3 also stores in the memory unit 4 the position of the source 24 and of the detector (for the latter, via the position of the detection support 25). The acquisition operation is repeated for several angle positions. The different data obtained correspond to the medical images Im which are then stored by the control unit 3 in the memory unit 4 of the imaging system 1 for subsequent use.

Figure 2:
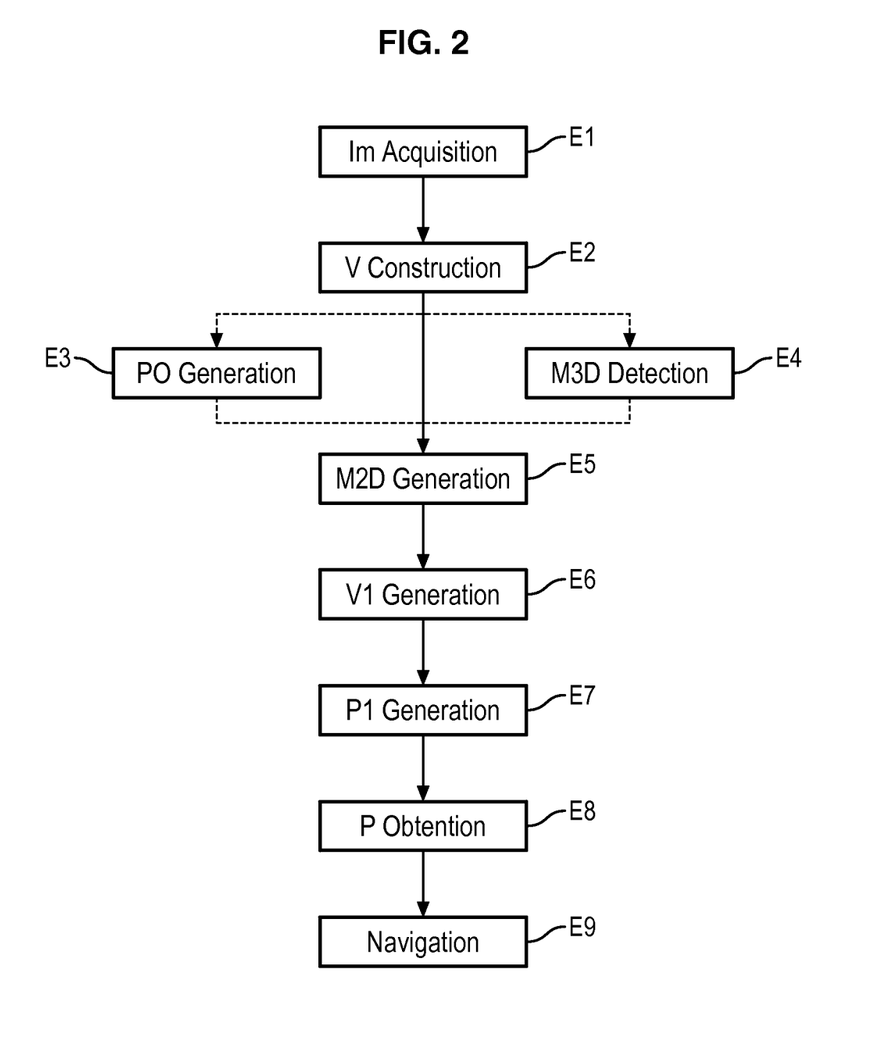
FIG. 2 is a flow chart illustrating the different steps of the method.
Figure 5:
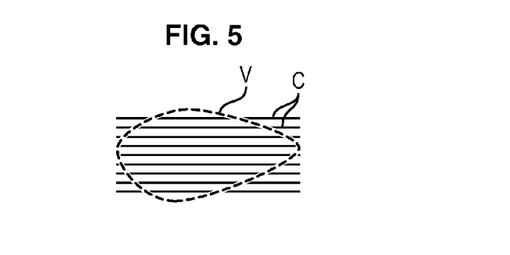
FIG. 5 illustrates the creation step of the method in FIG. 2 to create a 3D image of the tissue matrix.

The method may further comprise the creation E2 of a 3D image V of the breast O from the medical images Im as illustrated in FIGS. 2 and 5. The 3D computer 61 creates the 3D image V from the medical images Im stored in the memory unit 4. The transmission of data from the memory unit 4 can take place via an internal or external computer network or by means of any suitable, physical medium such as floppy disks, CD-ROM, DVD-ROM, external hard disk, USB flash drive, SD card . . . .

The creation by the 3D computer 61 of a 3D image V of the breast O enables a three-dimensional representation of the breast O to be obtained, and therefore enables the more exact location of radiological signs to be known when compared with a standard 2D image of the breast O in which it is not possible to know the position of the radiological signs in the direction of projection (straight line joining the source and the region of the 2D medical image showing the radiological sign). The 3D image is a matrix of voxels $Vox_V$. The value $\pi(Vox_V)$ of a voxel $Vox_V$ is proportional to the attenuation coefficient corresponding to the tissue located at the voxel $Vox_V$.

The method further comprises obtaining E3 a first image P0 similar to a standard mammogram. This image can be obtained in different manners notably, but not limited thereto, by one of the following manners. Firstly, this first image P0 can be obtained by the acquisition of a standard mammogram just before or just after the acquisition of the medical images Im. During this acquisition, the radiation dose emitted by the source is determined as usual and conventional. The first image P0 is thus a standard digital 2D medical image. Secondly, the first image P0 can be obtained by generating a projection of the 3D image V constructed by the computing system 6. Thirdly, the first image P0 can be obtained by construction from the medical images Im following the method described in application FR 09.599374. Finally, the first image P0 may be one of the medical images Im or it can be generated from all or part of the medical images Im.

In all cases, the first image P0 is a matrix of pixels $Pix_{P0}$ whose value $\pi(Pix_{P0})$ gives information on the absorption of X-rays after passing through the breast O. In addition, information is known concerning the real or simulated configuration of the system which allowed the generation of the first image P0, notably the relative positions (real or simulated) of the source S and of the detector.

Figure 6:
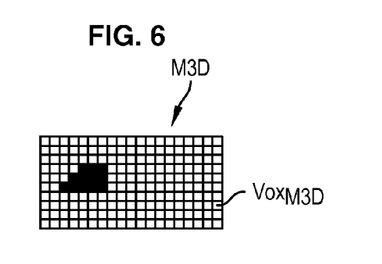
FIG. 6 illustrates the creation step of the method in FIG. 2 to create a 3D map of suspicion.

FIGS. 2 and 6 illustrate the generation E4 of a 3D map of suspicion M3D. The detection computer 71 creates the 3D map of suspicion M3D either from the medical images Im, or from the 3D image V, or from both. There are several methods to obtain said 3D map of suspicion M3D, for example using Digital Breast Tomosynthesis Computer-Aided Detection, such as that described for example in: <<Spiculated Lesions and Architectural Distortions Detection in Digital Breast Tomosynthesis Datasets>>, Palma G., Bloch I. and Muller S., in International Workshop on Digital Mammography (IWDM) 2010, Girona, Spain, or in: <Computer-Aided Microcalcification Detection on Digital Breast Tomosynthesis Data: a Preliminary Evaluation>>, Bernard S., Muller S., Onativia, J., in International Workshop on Digital Mammography (IWDM) 2008. The 3D map of suspicion M3D is a matrix of voxels $Vox_{M3D}$. For each of the voxels $Vox_{M3D}$, the value $\mu(Vox_{M3D})$ indicates a degree of suspicion giving an indication on the existence of a suspect radiological sign in the breast region corresponding to the voxel $Vox_{M3D}$.

The degree of suspicion $\mu(Vox_{M3D})$ may be a value of between 0 and 1, either discretely (the only values are then 0 and 1, i.e. $\mu(Vox_{M3D}) \in \{0;1\}$), or continuously (i.e. $\mu(Vox_{M3D}) \in [0;1]$). For example, if the region of the breast O corresponding to voxel $Vox_{M3D}$ does not show any suspect radiological sign resembling opacities, architectural distortions, microcalcifications or other, the degree of suspicion $\mu(Vox_{M3D})$ of the voxel $Vox_{M3D}$ assumes the value 0. If the region of the breast O corresponding to the voxel $Vox_{M3D}$ potentially comprises a suspect radiological sign, the degree of suspicion $\mu(Vox_{M3D})$ of the voxel $Vox_{M3D}$ assumes the value 1. When the value $\mu(Vox_{M3D})$ varies continually between 0 and 1, this reflects the degree of suspicion for the region corresponding to the voxel $Vox_{M3D}$. Evidently, the degree of suspicion $\mu(Vox_{M3D})$ may be defined so as to assume other values. The 3D map of suspicion M3D is stored in a memory unit 72 of the detection system 7. Therefore, an assistant tool is provided to detect pathological regions of the tissue matrix O.

Figure 7:
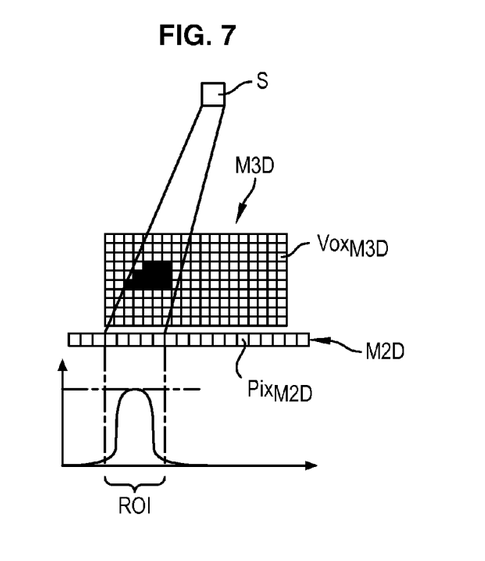
FIG. 7 illustrates the creation step of the method in FIG. 2 to create a 2D map of suspicion from the 3D map of suspicion.

From the 3D map of suspicion M3D, the computer 81 of the implementing system 8 generates a 2D map of suspicion M2D at step E5 as illustrated FIGS. 2 and 7. For this purpose, the computer 81 performs a projection of the 3D map of suspicion M3D, transmitted to it from the detecting system 7, onto a plane (represented by the 2D map of suspicion M2D in FIG. 7) starting from a point S. The positions of the plane and of point S respectively correspond to the positions of the detection support 25 and of the source 24 of the acquisition unit 2 which were used for the acquisition of the first image P0, or of the positions of point S and of the plane used during the construction of the first image P0 by simulation, which positions were stored in the memory unit 4 and can be transferred to the computer 81 in the same way as for the medical images Im described above (Step E3). The position of the 3D map of suspicion M3D corresponds to the position of the breast O at the time of acquisition of the first image P0. Therefore, for the generation of the 2D map of suspicion M2D the same conditions are reproduced as for the acquisition of the first image P0.

The 2D map of suspicion M2D is a matrix of pixels $Pix_{M2D}$. The value $\mu(Pix_{M2D})$ of each of the pixels $Pix_{M2D}$ can be calculated in different manners. In general, this value is the result of an aggregation operation such as the application of a t-conorm between the degrees of suspicion $\mu(Vox_{M3D})$ of the voxels $Vox_{M3D}$ of the 3D map of suspicion M3D through which a straight line L passes joining the pixel $Pix_{M2D}$ of the 2D map of suspicion M2D under consideration and point S, i.e.:

$$\mu(Pix_{M2D}) = \perp_{i \in L} \mu(Vox_{M3D}^{i});$$

$\perp$ symbolizing the t-conorm or other chosen aggregation operator.

A t-conorm is an associative, monotonic, commutative mathematical operator with an identity element of 0. The smallest t-conorm is the maximum. This gives:

$$\perp_{i \in L} \mu(Vox_{M3D}^{i}) \geq \max_{i \in L} \mu(Vox_{M3D}^{i}).$$

Regarding the maximum, for each pixel $Pix_{M2D}$ of the 2D map of suspicion M2D:

$$\mu(Pix_{M2D}) = \max_{i \in L} \mu(Vox_{M3D}^{i}).$$

It is to be noted that other aggregation operators can be used e.g. the average. Therefore, the 2D map of suspicion M2D indicates the suspect regions of the breast O in two dimensions, in the same way as for a standard medical image. The 2D map of suspicion M2D is stored by the computer 81 in the memory unit 82 of the implementing system 8.

The superimposition of healthy radiological signs, which may potentially be misleading in a standard medical image leading to the thinking that it relates to a pathological radiological sign, will therefore not produce information in the corresponding pixels $Pix_{M2D}$ of the 2D map of suspicion M2D that would indicate that the region is suspect. With the aggregation operator, e.g. the t-conorm $\perp$, the pixels $Pix_{M2D}$ of the 2D map of suspicion M2D corresponding to this region of the breast O will not indicate that this region is suspect.

Figure 8:
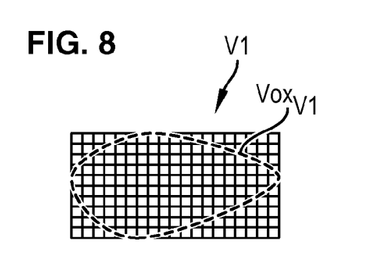
FIG. 8 illustrates the step in which the product of the 3D image and of the 3D map of suspicion is performed, giving a volume.

The method further comprises, as shown FIGS. 2 and 8, the computer 81 generating E6 a volume V1 from the 3D image V and from the 3D map of suspicion M3D. The volume V1 is a matrix of voxels $Vox_{V1}$ whose values are obtained by multiplying the voxels $Vox_V$ of the 3D image V with the corresponding voxels $Vox_{M3D}$ of the 3D map of suspicion M3D:

$$\pi(Vox_{V1}^{i}) = \pi(Vox_V^{i}) \cdot \mu(Vox_{M3D}^{i}).$$

The volume V1 is a representation of the breast O in which only the suspect regions are shown. The volume V1 is stored by the computer 81 in the memory unit 82 of the implementing system 8.

Figure 9:
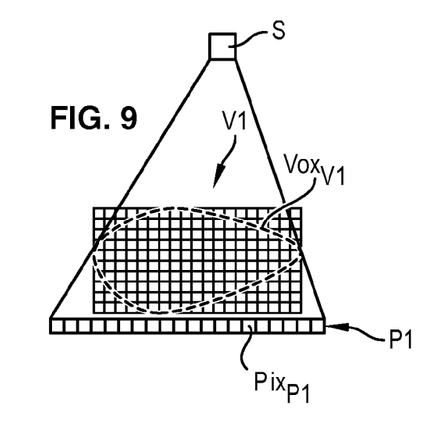
FIG. 9 illustrates the step to project the product illustrated FIG. 8.

The method further comprises, as shown in FIGS. 2 and 9, generating E7 an image P1 of suspect radiological signs. At this step E7, the computer 81 of the implementing system 8 projects the volume V1 from a point S onto a plane (represented by the image P1 of suspect radiological signs in FIG. 9). The relative positions of the volume V1, of point S and of the plane used by the computer 81 of the implementing system 8 are the same as those of the breast O, of the source 24 and of the detection support 25 while obtaining E3 of the first image P0.

The image P1 of suspect radiological signs is a 2D matrix of pixels $Pix_{P1}$ whose value $\pi(Pix_{P1})$ is calculated in similar manner to the pixels $Pix_{M2D}$ of the 2D map of suspicion M2D, but this time from volume V1:

$$\pi(Pix_{P1}) = A_{i \in L} \pi(Vox_V^{i}); \text{ i.e.}$$

$$\pi(Pix_{P1}) = A_{i \in L} \mu(Vox_{M3D}^{i}) \cdot \pi(Vox_V^{i}),$$

A being an aggregation operator such as the maximum, average, median or other.

Therefore, the image P1 of suspect radiological signs is a 2D image in which only potentially malignant radiological signs are shown, with reduced superimposition of the latter with the other structures contained in the object O. The image P1 of suspect radiological signs is stored by the computer 81 in the memory unit 82 of the implementing system 8.

Figure 10:
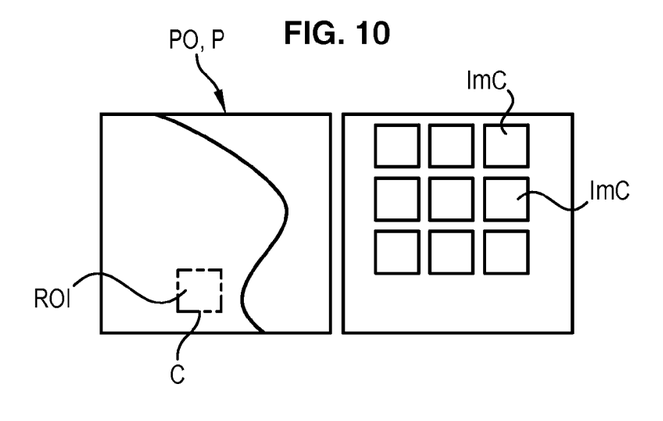
FIG. 10 schematically illustrates a first use of the method according to FIG. 2 for 3D navigation through the tissue matrix.

The method further comprises, as shown in FIGS. 2 and 10, generating E8 the final 2D image P. The final 2D image P is a 2D matrix of pixels $Pix_P$. For each of the pixels $Pix_P$, the computer 81 computes the value $\pi(Pix_P)$ as follows:

$$\pi(Pix_P^i)=\beta \cdot [(1-\mu(Pix_{M2D}^i)) \cdot \pi(Pix_{P0}^i)+\pi(Pix_{P1}^i)]+(1-\beta) \cdot \pi(Pix_{P1}^i);$$

in which $\beta$ lies between 0 and 1.

Choosing a value $\beta$ different from 1 amounts to choosing a degree of suspicion $\mu(Vox_{M3D})$ of the 3D map of suspicion M3D of between 0 and $\beta$. Therefore, it is possible to act on the value of $\beta$ to delete, to a greater or lesser extent, the effect of tissue superimposition at the suspect regions in the final 2D image P. Therefore, it is possible to act on the value of $\beta$ for greater or lesser perception of information above and below the suspect regions. If $\beta=0$, this amounts to working on the first image P0.

It will be noted that improvements can be made to the method for constructing the final 2D image P, notably the enhancing of details in the image P1 of suspect radiological signs using a filter, its weighting with a coefficient, or the filtering of the final 2D image P solely in the suspect regions that are particularly visible in the 2D map of suspicion M2D. Filtering will amplify some frequencies or some structures in the final 2D image P. With filtering, better evidencing of suspect structures therefore becomes possible.

It is possible to only work on a region of interest ROI once it has been identified in the 3D map of suspicion M3D or 2D map of suspicion M2D. Identification of the region of interest ROI can be carried out by the practitioner or automatically, for example through thresholding the 2D map of suspicion M2D by comparing the value of the pixels $\mu(Pix_{M2D})$ with a threshold value, or thresholding the 3D map of suspicion M3D followed by projection of the result of thresholding of the 3D map of suspicion M3D in the same way as the projection to obtain the 2D map of suspicion M2D. The steps are then easily modified so that they only concern this region of interest ROI. For example, at step E5, the computer 81 of the implementing system 8 only projects that part of the 3D map of suspicion M3D through which straight lines pass, passing through point S and the vicinity of the region of interest ROI to obtain a partial 2D map of suspicion M2D. The region of interest ROI may also have been detected by the practitioner in the first image P0.

The method may also enable navigation E9 through the breast O. In this case, the operating functions of the implementing system 8, presented below, are available on the system enabling the radiologist to view images. For this purpose, the computer 81 sends a display signal of an image of the breast O to a display unit which may be the display unit 5 of the imaging system 1. The displayed image can either be the first image P0 or the final 2D image P described above. The computer 81 also controls the labelling of one or more regions of interest ROI identified in the displayed image, by means of a contour C that can be rectangular, square or of arbitrary shape as illustrated FIG. 10.

Several images, corresponding to slices ImC of the breast O at the region of interest ROI and parallel to the displayed image of the breast O, are also displayed on the display unit 5 or another display unit. The slices ImC may be whole slices or they may correspond to regions of interest ROI in the latter corresponding to regions of interest ROI labelled in the 2D image. The slices ImC of the breast O may be generated from the 3D image V of the breast O, as in mammary tomosynthesis. These slices ImC can be shown either at the same time as the displayed image of the breast, or when the labelling C of the region(s) of interest ROI is selected. Selection can be made by clicking on C labelling using a man-to-machine interface such as a mouse or stylus.

The slices ImC of the breast are classified in order of suspicion $\mu ImC$ conformingly with the 3D map of suspicion M3D. For this purpose, for each of the slices ImC, an average, a median, a minimum, a maximum or any other value obtained by an operator M can be calculated on the values of degrees of suspicion $\mu(Vox_{M3D})$ of the voxels Vox in the 3D map of suspicion M3D corresponding to the slice ImC:

$$\mu_{ImC}=M_{i \in ImC}\mu(Vox_{M3D}^i).$$

Therefore, the practitioner can easily navigate through the breast O for better location of the radiological sign. The practitioner is therefore provided with more optimal guiding through potentially suspect regions.

Figure 11:
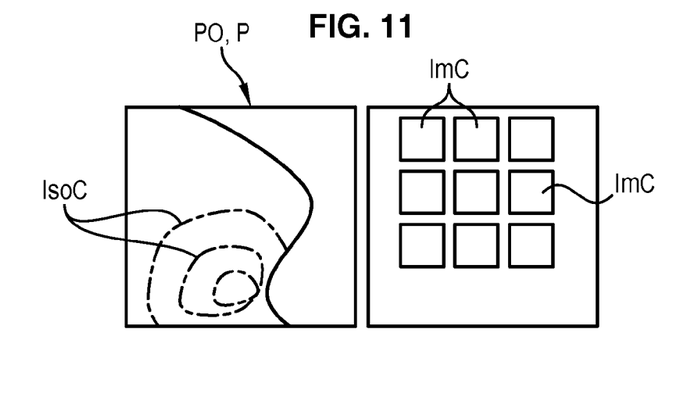
FIG. 11 schematically illustrates a second use of the method according to FIG. 2 for 3D navigation through the tissue matrix.

In one variant illustrated FIG. 11, the computer 81 controls the display of a watermark which is overlaid over the displayed image of the breast O. This watermark indicates the degree of suspicion of regions in the breast O. The watermark is constructed from the 2D map of suspicion M2D and shows isocontours IsoC of the 2D map of suspicion M2D. An isocontour IsoC is a continuous line which marks the boundary between two regions of the 2D map of suspicion M2D in which the pixels $Pix_{M2D}$ have substantially different values $\mu(Pix_{M2D})$. The isocontours IsoC can be indicated in the watermark by lines along these isocontours IsoC or by coloured areas. In this latter case, the boundaries between the two regions of different colours are isocontours IsoC.

The degree of suspicion $\mu(Pix_{M2D})$ can also be displayed when a cursor is moved over the image of the breast O, for example either in a fixed window outside the image of the breast O, or in a small window which moves with the cursor. This provides the practitioner with annotated mapping of the breast O. With these two 3D navigation steps, the practitioner is provided with tools to assist in preparing the diagnosis of radiological signs. This variant can be combined with the first variant enabling the practitioner to change over from one depiction of the breast to another, if needed.

The method can be implemented by a computer program comprising machine instructions for this purpose recorded on any suitable medium, for example: hard disk, CD-ROM, DVD-ROM, floppy disks, USB flash drive, SD Card, local or remote server.

What is claimed is:

1. A method to generate a final image with a medical imaging system, wherein the final image highlights suspect regions in a tissue matrix and wherein the final image is generated from a first image and from previously acquired images of the tissue matrix, the method comprising:

creating a 3D map of suspicion with a detection computer from the previously acquired medical images, wherein the 3D map of suspicion comprises a 3D matrix of voxels whose values indicate a degree of suspicion that shows whether the corresponding regions of the tissue matrix are suspect;

generating a 2D map of suspicion with an implementing computer by projecting all or part of the 3D map of suspicion onto a plane from a point reproducing the conditions of acquisition of the first image, wherein the 2D map of suspicion comprises a 2D matrix of pixels whose values indicate a degree of suspicion that is determined from the corresponding degree of suspicion from the 3D map of suspicion;

generating a volume with the implementing computer from a previously obtained 3D image and from the 3D map of suspicion, wherein the 3D image comprises a matrix of voxels whose values are obtained from intensities of the previously acquired images, and wherein the volume comprises a matrix of voxels whose values are determined by multiplying the values of the corresponding voxels in the 3D map of suspicion and those in the 3D image;

generating an image of suspect radiological signs with the implementing computer by projecting the volume onto a plane from the point reproducing the acquisition conditions of the first image, wherein the image of suspect radiological signs comprises a matrix of pixels, and wherein the value of one pixel of the image of suspect radiological signs is obtained by applying an aggregation operator to the values of voxels of the volume located on a straight line joining the point reproducing the acquisition conditions of the first image and the pixel, such that:

$$\pi(Pix_{P1}) = \perp_{i \in L} \pi(Vox_{V1}^{i}),$$

wherein P1 is the image of suspect radiological signs, $Pix_{P1}$ is a pixel in the image of suspect radiological signs, $\pi(Pix_{P1})$ is the value of one pixel of suspect radiological signs, V1 is the volume, $Vox_{V1}^{i}$ are voxels of the volume and $\pi(Vox_{V1}^{i})$ are values of the voxels of the volume; and generating a final 2D image of the tissue matrix with the implementing computer from the first image and/or from the 2D map of suspicion, wherein the final 2D image highlights suspect regions in the tissue matrix.

2. The method according to claim 1, wherein the imaging system is a breast tomosynthesis system.

3. The method according to claim 1, wherein the value of a pixel in the 2D map of suspicion is obtained by an aggregation operation on the values of the voxels in the 3D map of suspicion located on a straight line joining the point reproducing the conditions of acquisition of the first image and the pixel in the 2D map, such that:

$$\mu(Pix_{M2D}) = \perp_{i \in L} \mu(Vox_{M3D}^{i}),$$

wherein M2D is the 2D suspicion map, $Pix_{M2D}$ is a pixel in the 2D suspicion map, $\mu(Pix_{M2D})$ is the value of a pixel in the 2D suspicion map, M3D is the 3D suspicion map, $Vox_{M3D}^{i}$ are voxels in the 3D suspicion map, and $\mu(Vox_{M3D}^{i})$ are the values of voxels in the 3D suspicion map.

4. The method according to claim 1, wherein the implementing computer generates the final 2D image by performing a weighted addition of all or part of the values of the pixels in the first image, in the image of suspect radiological signs and in the 2D map of suspicion.

5. The method according to claim 1, wherein once the 3D map of suspicion has been created, the implementing computer only works on one part of the maps and images, wherein the one part is a region of interest determined from the 3D map of suspicion as possibly being a suspect region.

6. The method according to claim 5, wherein the region of interest is produced automatically from the 3D map of suspicion.

7. The method according to claim 5, further comprising:
displaying an image of the tissue matrix on a display device, wherein the image of the tissue matrix comprises the first image or a final 2D image;
labelling the region of interest in the image of the tissue matrix; and
displaying several images on the display device or on another display device, the several images corresponding to slices of the tissue matrix at the region of interest and parallel to the image of the tissue matrix, wherein the slices of the tissue matrix are classified in order of suspicion according to the 3D map of suspicion.

8. The method according to claim 1, further comprising:
displaying an image of the tissue matrix on a display device;
overlaying a watermark indicating the degree of suspicion of a region of the tissue matrix on the image of the tissue matrix, wherein the watermark is constructed from the 2D map of suspicion and reveals isocontours of the 2D map of suspicion.

9. The method according to claim 8, wherein the isocontours are indicated in the watermark by lines or coloured areas.

* * * * *